INVENTOR
ROBERT E. HEFFRON
RUSSEL W. MEREDITH
BY
*Wm. H. Dean*

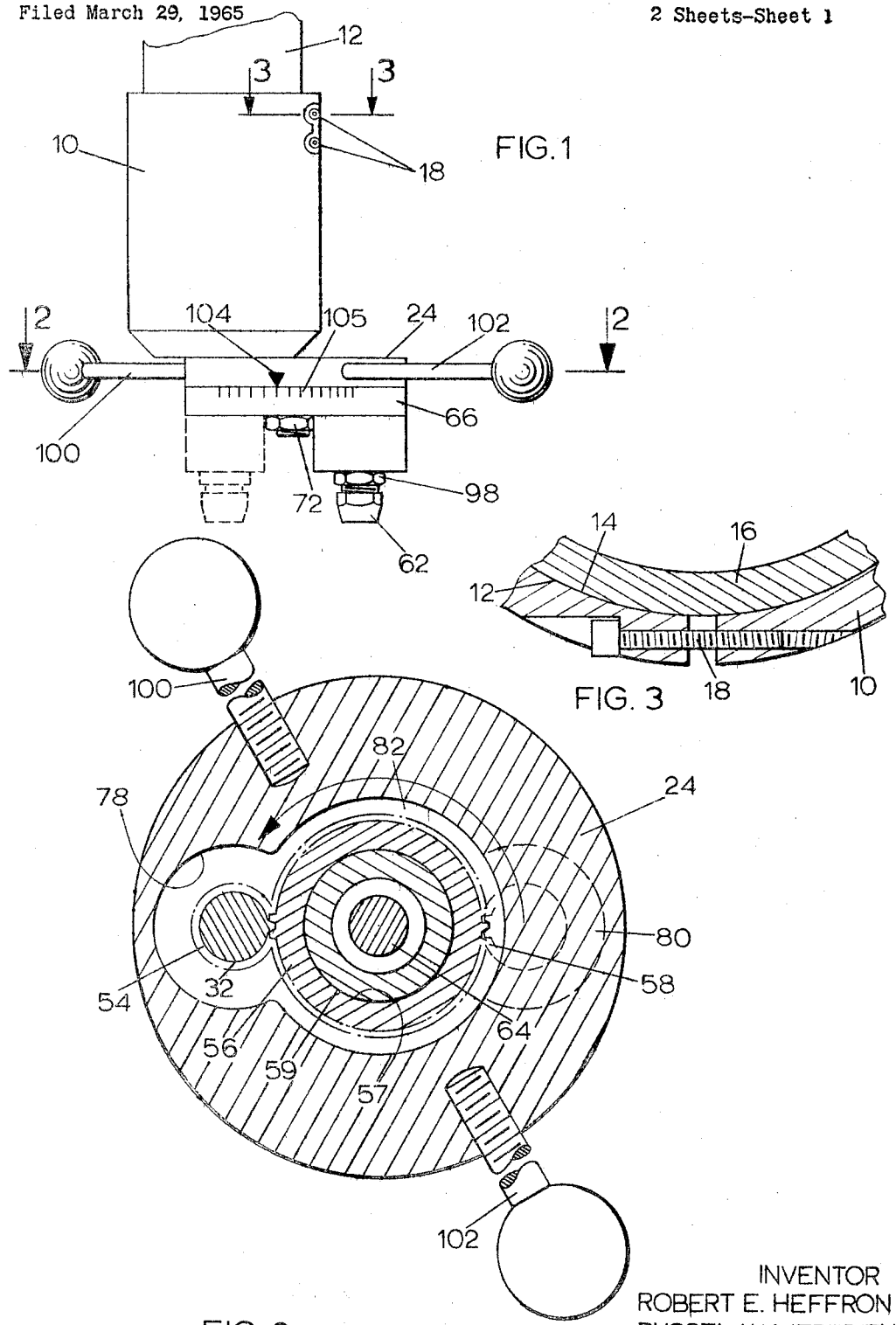

United States Patent Office 3,263,570
Patented August 2, 1966

3,263,570
HOLE MILLING ATTACHMENT FOR MACHINE TOOLS
Robert E. Heffron, 603 E. 4th Ave., and Russell W. Meredith, 405 E. 10th St., both of Mesa, Ariz.
Filed Mar. 29, 1965, Ser. No. 443,603
6 Claims. (Cl. 90—15)

This invention relates to a hole milling attachment for machine tools, and more particularly, to a hole milling attachment for various machine tools to increase the versatility thereof, and for the purpose of milling arcuate slots or round holes in various objects, as desired.

Various prior art attachments for machine tools have been employed for the purpose of milling arcuate slots or round holes, however, most of these prior art devices have been quite expensive, relatively complicated, and some of them have been so constructed that the attachment thereof to a conventional machine tool becomes quite time consuming. Additionally, many prior art hole milling attachments for machine tools have been bulky in order to overcome the tendency of such tools to chatter and operate inaccurately.

Accordingly, it is an object of the present invention to provide a hole milling attachment for machine tools which is very simple and economical to produce and operate.

Another object of the invention is to provide a hole milling attachment for machine tools which is very simple to attach to a conventional spindle bearing housing of a machine tool in such a manner that the attachment is accurately and rigidly connected thereto.

Another object of the invention is to provide a hole milling attachment for machine tools which is very small and compact in proportion to its capacity.

Another object of the invention is to provide a hole milling attachment for machine tools having novel means for loading the power input shaft bearings by means of a collet and drawbar mechanism in a machine tool spindle, to thereby permit the attachment of the invention to be rotated about the axis thereof and yet resist a tendency to chatter or to become inaccurate.

Another object of the invention is to provide a very novel hole milling attachment for machine tools having a power input shaft and a power output shaft and wherein an idler gear is disposed in meshed relation with a gear on the input shaft and a gear on the output shaft, and whereby the input shaft is rotatably mounted in one frame member, while the output shaft is rotatably mounted in another frame member and each of the power input and output shaft gears are retained in recesses in the respective frame members and wherein the idler gear is of an axial length sufficient to overlap both said input and output shaft gears and thereby permitting the output shaft to be pivoted around a clamping bolt with the respective housing or frame member relative to the frame member and the axis of the power input shaft.

Another object of the invention is to provide a hole milling attachment for machine tools which may be very quickly, easily, and positively adjusted to mill various arcuate slots or holes in various materials with a minimum amount of setup time.

Further objects and advantages of the present invention may be apparent from the following specification, appended claims, and accompanying drawings, in which:

FIG. 1 is a side elevational view of a hole milling attachment for machine tools in accordance with the present invention and showing said attachment in connection with a fragmentary portion of a spindle bearing housing of a machine tool and illustrating by broken lines a varying position of a tool supporting shaft structure of the attachment of the invention;

FIG. 2 is an enlarged plan sectional view taken from the line 2—2 of FIG. 1, showing portions fragmentarily to facilitate the illustration;

Figure 4:
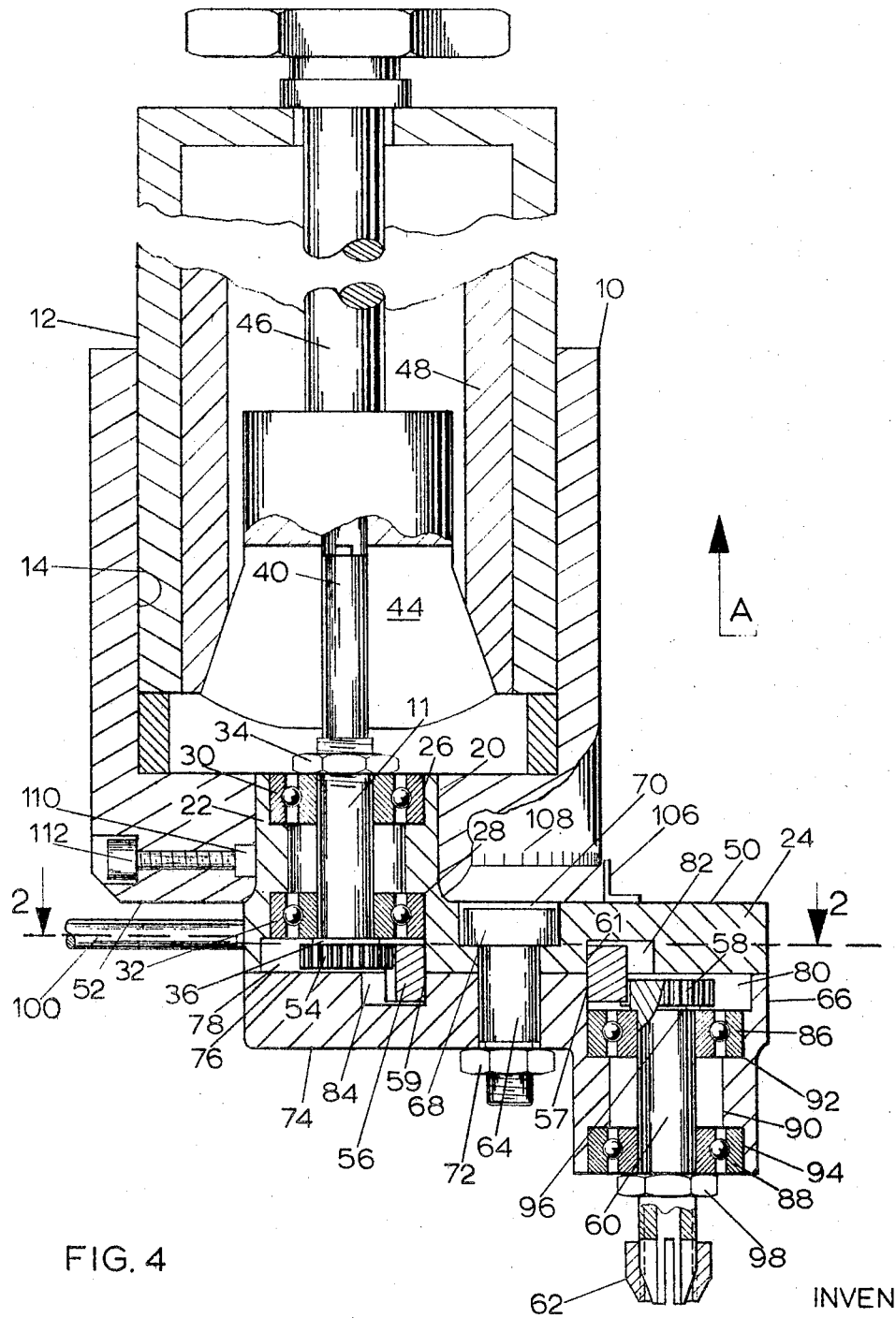

FIG. 3 is an enlarged fragmentary sectional view taken from the line 3—3 of FIG. 1; and FIG. 4 is an enlarged vertical sectional view of the hole milling attachment for machine tools of the present invention and illustrating fragmentarily a spindle bearing housing of a machine tool together with a drawbar and collet mechanism for connecting the driven spindle of the machine tool and the power input shaft of the attachment of the invention.

As shown in FIG. 1 of the drawing, the hole milling attachment for machine tools in accordance with the present invention, is provided with a first hollow cylindrical frame member 10, which surrounds and is secured to a conventional machine tool spindle bearing housing 12.

It will be seen from FIGS. 1, 3 and 4, that the first frame member 10 is a hollow cylindrical frame member having a bore 14 fitted over the machine tool spindle bearing housing 12. The side wall of the hollow cylindrical frame 10 is provided with a slotted portion 16, shown in FIG. 3 of the drawings, which is spanned by a pair of clamp screws 18, which tend to contract the bore 14. Thus, the hollow cylindrical frame 10 of the invention is fixed concentrically and rigidly with respect to the axis of the conventional machine tool spindle bearing housing.

The frame member 10 is provided with a second bore portion 20 concentrically aligned with the bore portion 14 and pivotally mounted in this bore portion 20 is a hollow cylindrical portion 22 of a second frame member 24 of the invention.

Mounted in the hollow cylindrical portion 22 of the frame member 24 are bearings 26 and 28 having their outer races abutted to portions 30 and 32 in the hollow cylindrical portion 22 of the frame 24. A power input shaft 11 is carried in the inner races of the bearings 26 and 28 and a screw-threaded nut 34 is abutted to the inner race of the bearing 26, while a shoulder 36 of the shaft 11 is abutted to the inner race of the bearing 28, thus, the bearings are preloaded and an extending portion 40 of the shaft 11 extends beyond the hollow cylindrical portion 22 of the frame 24 and is held in a conventional collet 44 secured by a conventional drawbar 46 in a conventional machine tool arbor shaft 48. Thus, the shaft 11 at its end portion 40 is gripped by the collet 44 and preloaded in a direction of an arrow A which tends to hold the hollow cylindrical portion 22 and the frame member 24 upwardly in the direction of the arrow A to thereby attain an abutment of an upper surface 50 of the frame member 24 with a lower surface 52 of the frame member 10 at a terminus of the bore 20 thereof. Thus, the drawbar 46 and collet 44 tend to hold the frame 24 upwardly against the frame 10 and concurrently load the bearings 26 and 28 to prevent any looseness of the attachment assembly which might permit tool induced vibration or that which is commonly known as chatter.

Fixed to the normally lower end of the shaft 11 is a spur gear 54, which meshes with a ring-shaped idler gear 56 which in turn meshes with a spur gear 58 fixed to a power output shaft 60 having a tool holding chuck 62 on its normally lower end.

The ring-shaped idler gear is rotatably mounted concentrically about an axis of a clamping bolt 64 which secures a third frame member 66 in pivotal connection with the frame member 24. The clamping bolt 64 is provided with an enlarged head 68 mounted in a recess 70 in the frame member 24 and a clamping nut 72 on the normally lower end of the bolt 64 bears against a normally lower surface 74 of the frame member 66 to thereby clamp the frame members 24 and 66 together at a plane designated 76 in FIG. 4 of the drawings.

It will be appreciated that the bolt 64 be concentric with the idler gear 56 permits the driven gear 58 to be pivoted concentrically around the idler gear 56 and about the axis of the clamping bolt 64 either 180 degrees from the shaft 32 and gear 54 or into substantial axial alignment therewith, as will be hereinafter described in detail.

It will be seen that the frame 24 is provided with a recess 78 disposed above the plane 76 which forms a parting line between the frame members 24 and 66 and this recess 78 contains the gear 54, while a recess 80 in the upper surface of the frame member 66 contains the gear 58 below the parting plane 76 between the frame members 24 and 66.

It also will be seen that the axial length of the ring-shaped idler gear 56 spans the parting plane 76 and is disposed partially in a recess 82 in the frame member 24 and a comparable recess 84 in the frame member 66 which recess 84 is normally below the parting plane 76 between the frame members 24 and 66.

Thus, the axial length of the ring-shaped idler gear 56 is sufficient to span the gears 54 and 58 in their respective recesses 78 and 80 in the respective frame members 24 and 26.

The gear 56 is provided with a bearing bore 57 which rotates around bearing bosses 59 and 61 of the frame members 24 and 66 respectively. These bearing bosses are concentric with the clamp bolt 64.

The shaft 60 carrying the gear 58 is mounted in bearings 86 and 88 located in a bore portion 90 of the frame member 66. This bore 90 is provided with respective ledge portions 92 and 94 forming axial abutments for the outer races of the bearings 92 while the inner races carry the shaft 60, which is provided with a shoulder 96 engaging an inner race of the bearing 86, while a screw-threaded nut 98 engages and bears upon the inner race of the bearing 88 to preload these bearings and precisely hold the shaft 60 in the frame member 24 to permit precise rotation thereof without induced vibration or chattering action.

The normally lower end of the shaft 60 carries the tool holding chuck 62 which may hold milling cutters or the like.

Secured to the frame member 24 are manually operable handles 100 and 102, as shown best in FIGS. 1, 2 and 4 of the drawings. These handles are for use in manually rotating the frame 24, together with the frame 66, about the axis of the shaft 32 when power is delivered to the shaft 32 and transmitted through gears 54, 56, and 58 to the power output shaft 60. When such pivotal movement of the frame members 24 and 66 is effected, the locking bolt 64 holds the frame members 24 and 66 in juxtaposition and a milling cutter, or other tool, held in the chuck 62 may mill or cut various materials in an arcuate path, in a semi-circle, or a complete circle, as desired.

The radius of the shaft 60 from the shaft 32 may be varied, as desired, by loosening the nut 72 of the bolt 64 and rotating the frame member 66 relative to the frame member 24 and then the nut 72 may be tightened on the bolt 64 to clamp the frame members 24 and 66 together and hold them in juxtaposition with relation to each other. Thus, the distance of the axis of the shaft 60 from the axis of the shaft 32 may be varied as desired, to provide for milling or cutting operations on various radii.

It will be seen from FIG. 1 of the drawings that a pointer 104 on the frame member 24 may line with calibrations 105 on the frame member 66 to indicate the number of degrees or the distance between the axes of the shafts 32 and 60 when the hereinbefore described adjustment is made. Additionally, a pointer 106 mounted on the frame member 24, may be referenced to a scale 108 on the hollow cylindrical frame member 10 in order to indicate relative rotational adjustments or a number of degrees of an arc being milled by the machine, when the handles 100 and 102 are used to rotate the frame members 24 and 66 about the axis of the shaft 32 during operation of the tool held in the chuck 62, as hereinbefore described.

A clamping gib 110, carried by the frame member 10, bears on an outer surface of the hollow cylindrical portion 22 of the frame 24 and the gib 110 may be forced inwardly against the outer surface of the hollow cylindrical portion 22 by means of a screw 112 screw-threaded in the frame member 10. In this manner, the frame member 24 may be locked against rotation relative to the frame 10, if desired.

It will be obvious to those skilled in the art that various modifications of the present invention may be resorted to in a manner limited only by a just interpretation of the following claims.

We claim:

1. In a hole milling attachment for machine tools the combination of: a power machine tool spindle bearing housing; a first frame member; a hollow cylindrical portion of said first frame member having a bore fitted over said spindle bearing housing; first means for fixing said hollow cylindrical portion on said spindle bearing housing; a second bore portion of said hollow cylindrical portion, said second bore portion axially aligned with said first mentioned bore; a second frame member of said attachment; a circular in cross section portion of said second frame member projecting into and closely rotatably fitted in said second bore portion; an abutment portion of said first frame near a terminus of said second bore portion; an abutment shoulder of said second frame member rotatably and axially abutted to said abutment portion; radial and thrust bearing means carried and supported within said circular in cross section portion of said second frame; a power input shaft radially and axially supported by said bearing means; an extending end portion of said power input shaft projecting beyond said bearing means and said second frame member; engaging and driving means rotatably mounted in said spindle bearing housing; said engaging and driving means drivingly coupled to said extending portion of said power input shaft; a third frame member; a clamping bolt disposed axially parallel to and spaced radially from said power input shaft, said third frame member pivotally mounted on said second frame member by said clamping bolt, said clamping bolt adapted when tightened to fix said third frame member relative to said second frame member; idler bearing means concentrically surrounding said bolt; an idler gear concentrically rotatably supported by said idler bearing means; a power input gear carried by said power input shaft, said power input gear meshing with said idler gear; an output shaft; bearing means for said output shaft, said last mentioned bearing means carried by said third frame member; said output shaft being axially parallel with said bolt and said power input shaft, said output shaft being radially spaced from the axis of said bolt; a third gear on said output shaft and in mesh with said idler gear; a first recess in said second frame member in which said power input gear is contained; a second recess in said third frame member in which said third gear is contained; said idler gear being of an axial length to overlap both said first and second recesses and to thereby mesh with both said power input gear and said third gear; and a tool holding end portion of said output shaft projecting from said third frame member.

2. In a hole milling attachment for machine tools the combination of: a power machine tool spindle bearing housing; a first frame member; a hollow cylindrical portion of said first frame member having a bore fitted over said spindle bearing housing; first means for fixing said hollow cylindrical portion on said spindle bearing housing; a second bore portion of said hollow cylindrical portion, said second bore portion axially aligned with said first mentioned bore; a second frame member of said attachment; a circular in cross section portion of said second frame member projecting into and closely rotatably fitted in said second bore portion; an abutment portion of said first frame near a terminus of said second bore portion; an abutment shoulder of said second frame member rotatably and axially abutted to said abutment portion; radial and thrust bearing means carried and supported within said circular in cross section portion of said second frame; a power input shaft radially and axially supported by said bearing means; an extending end portion of said power input shaft projecting beyond said bearing means and said second frame member; engaging and driving means rotatably mounted in said spindle bearing housing; said engaging and driving means drivingly coupled to said extending portion of said power input shaft; a third frame member; a clamping bolt disposed axially parallel to and spaced radially from said power input shaft, said third frame member pivotally mounted on said second frame member by said clamping bolt, said clamping bolt adapted when tightened to fix said third frame member relative to said second frame member; idler bearing means concentrically surrounding said bolt; an idler gear concentrically rotatably supported by said idler bearing means; a power input gear carried by said power input shaft, said power input gear meshing with said idler gear; an output shaft; bearing means for said output shaft, said last mentioned bearing means carried by said third frame member; said output shaft being axially parallel with said bolt and said power input shaft, said output shaft being radially spaced from the axis of said bolt; a third gear on said output shaft and in mesh with said idler gear; a first recess in said second frame member in which said power input gear is contained; a second recess in said third frame member in which said third gear is contained; said idler gear being of an axial length to overlap both said first and second recesses and to thereby mesh with both said power input gear and said third gear; and a tool holding end portion of said output shaft projecting from said third frame member; a hollow machine tool shaft rotatably mounted in said spindle bearing housing; said engaging and driving means comprising a collet and drawbar disposed in said hollow machine tool shaft, said collet and drawbar disposed to exert axial force on said power input shaft to preload said radial and thrust bearings in a direction tending to force said second frame member toward and into engagement with said abutment portion of said first frame member.

3. In a hole milling attachment for machine tools the combination of: a power machine tool spindle bearing housing; a first frame member; a hollow cylindrical portion of said first frame member having a bore fitted over said spindle bearing housing; first means for fixing said hollow cylindrical portion on said spindle bearing housing; a second bore portion of said hollow cylindrical portion, said second bore portion axially aligned with said first mentioned bore; a second frame member of said attachment; a circular in cross section portion of said second frame member projecting into and closely rotatably fitted in said second bore portion; an abutment portion of said first frame near a terminus of said second bore portion; an abutment shoulder of said second frame member rotatably and axially abutted to said abutment portion; radial and thrust bearing means carried and supported within said circular in cross section portion of said second frame; a power input shaft radially and axially supported by said bearing means; an extending end portion of said power input shaft projecting beyond said bearing means and said second frame member; engaging and driving means rotatably mounted in said spindle bearing housing; said engaging and driving means drivingly coupled to said extending portion of said power input shaft; a third frame member; a clamping bolt disposed axially parallel to and spaced radially from said power input shaft, said third frame member pivotally mounted on said second frame member by said clamping bolt, said clamping bolt adapted when tightened, to fix said third frame member relative to said second frame member; idler bearing means concentrically surrounding said bolt; an idler gear concentrically rotatably supported by said idler bearing means; a power input gear carried by said power input shaft, said power input gear meshing with said idler gear; an output shaft; bearing means for said output shaft, said last mentioned bearing means carried by said third frame member; said output shaft being axially parallel with said bolt and said power input shaft, said output shaft being radially spaced from the axis of said bolt; a third gear on said output shaft and in mesh with said idler gear; a first recess in said second frame member in which said power input gear is contained; a second recess in said third frame member in which said third gear is contained; said idler gear being of an axial length to overlap both said first and second recesses and to thereby mesh with both said power input gear and said third gear; and a tool holding end portion of said output shaft projecting from said third frame member; said idler bearing means including portions of both said second and third frame members, concentrically and radially outward from said clamp bolt.

4. In a hole milling attachment for machine tools the combination of: a power machine tool spindle bearing housing; a first frame member; a hollow cylindrical portion of said first frame member having a bore fitted over said spindle bearing housing; first means for fixing said hollow cylindrical portion on said spindle bearing housing; a second bore portion of said hollow cylindrical portion, said second bore portion axially aligned with said first mentioned bore; a second frame member of said attachment; a circular in cross section portion of said second frame member projecting into and closely rotatably fitted in said second bore portion; an abutment portion of said first frame near a terminus of said second bore portion; an abutment shoulder of said second frame member rotatably and axially abutted to said abutment portion; radial and thrust bearing means carried and supported within said circular in cross section portion of said second frame; a power input shaft radially and axially supported by said bearing means; an extending end portion of said power input shaft projecting beyond said bearing means and said second frame member; engaging and driving means rotatably mounted in said spindle bearing housing; said engaging and driving means drivingly coupled to said extending portion of said power input shaft; a third frame member; a clamping bolt disposed axially parallel to and spaced radially from said power input shaft, said third frame member pivotally mounted on said second frame member by said clamping bolt, said clamping bolt adapted when tightened, to fix said third frame member relative to said second frame member; idler bearing means concentrically surrounding said bolt; an idler gear concentrically rotatably supported by said idler bearing means; a power input gear carried by said power input shaft, said power input gear meshing with said idler gear; an output shaft; bearing means for said output shaft, said last mentioned bearing means carried by said third frame member; said output shaft being axially parallel with said bolt and said power input shaft, said output shaft being radially spaced from the axis of said bolt; a third gear on said output shaft and in mesh with said idler gear; a first recess in said second frame member in which said power input gear in contained; a second recess in said third frame member in which said third gear is contained; said idler gear being of an axial length to overlap both said first and second recesses and to thereby mesh with both said power input gear and said third gear; and a tool holding end portion of said output shaft projecting from said third frame member; handle means on said second frame member for manually pivoting it and said third frame member relative to said first housing around the axis of said circular in cross section portion and said power input shaft.

5. In a hole milling attachment for machine tools the combination of: a power machine tool spindle bearing housing; a first frame member; a hollow cylindrical portion of said first frame member having a bore fitted over said spindle bearing housing; first means for fixing said hollow cylindrical portion on said spindle bearing housing; a second bore portion of said hollow cylindrical portion, said second bore portion axially aligned with said first mentioned bore; a second frame member of said attachment; a circular in cross section portion of said second frame member projecting into and closely rotatably fitted in said second bore portion; an abutment portion of said first frame near a terminus of said second bore portion; an abutment shoulder of said second frame member rotatably and axially abutted to said abutment portion; radial and thrust bearing means carried and supported within said circular in cross section portion of said second frame; a power input shaft radially and axially supported by said bearing means; an extending end portion of said power input shaft projecting beyond said bearing means and said second frame member; engaging and driving means rotatably mounted in said spindle bearing housing; said engaging and driving means drivingly coupled to said extending portion of said power input shaft; a third frame member; a clamping bolt disposed axially parallel to and spaced radially from said power input shaft, said third frame member pivotally mounted on said second frame member by said clamping bolt, said clamping bolt adapted when tightened, to fix said third frame member relative to said second frame member; idler bearing means concentrically surrounding said bolt; an idler gear concentrically rotatably supported by said idler bearing means; a power input gear carried by said power input shaft, said power input gear meshing with said idler gear; an output shaft; bearing means for said output shaft, said last mentioned bearing means carried by said third frame member; said output shaft being axially parallel with said bolt and said power input shaft, said output shaft being radially spaced from the axis of said bolt; a third gear on said output shaft and in mesh with said idler gear; a first recess in said second frame member in which said power input gear is contained; a second recess in said third frame member in which said third gear is contained; said idler gear being of an axial length to overlap both said first and second recesses and to thereby mesh with both said power input gear and said third gear; and a tool holding end portion of said output shaft projecting from said third frame member; said first means comprising a slotted wall portion of said hollow cylindrical portion; and clamp bolt means abridging said slotted wall portion and when tightened disposed to contract said bore of said hollow cylindrical portion around said spindle bearing housing.

6. In a hole milling attachment for machine tools the combination of: a power machine tool spindle bearing housing; a first frame member; a hollow cylindrical portion of said first frame member having a bore fitted over said spindle bearing housing; a first means for fixing said hollow cylindrical portion of said spindle bearing housing; a second bore portion of said hollow cylindrical portion, said second bore portion axially aligned with said first mentioned bore; a second frame member of said attachment; a circular in cross section portion of said second frame member projecting into and closely rotatably fitted in said second bore portion; an abutment portion of said first frame near a terminus of said second bore portion; an abutment shoulder of said second frame member rotatably and axially abutted to said abutment portion; radial and thrust bearing means carried and supported within said circular in cross section portion of said second frame; a power input shaft radially and axially supported by said bearing means; an extending end portion of said power input shaft projecting beyond said bearing means and said second frame member; engaging and driving means rotatably mounted on said spindle bearing housing; said engaging and driving means drivingly coupled to said extending portion of said power input shaft; a third frame member; a clamping bolt disposed axially parallel to and spaced radially from said power input shaft, said third frame member pivotally mounted on said second frame member by said clamping bolt, said clamping bolt adapted when tightened, to fix said third frame member relative to said second frame member; idler bearing means concentrically surrounding said bolt; an idler gear concentrically rotatably supported by said idler bearing means; a power input gear carried by said power input shaft, said power input gear meshing with said idler gear; an output shaft; bearing means for said output shaft, said last mentioned bearing means carried by said third frame member; said output shaft being axially parallel with said bolt and said power input shaft, said output shaft being radially spaced from the axis of said bolt; a third gear on said output shaft and in mesh with said idler gear; a first recess in said second frame member in which said power input gear is contained; a second recess in said third frame member in which said third gear is contained; said idler gear being of an axial length to overlap both said first and second recesses and to thereby mesh with both said power input gear and said third gear; and a tool holding end portion of said output shaft projecting from said third frame member; the radial spacing of said power output shaft and said power input shaft from said clamping bolt being substantially equal.

No references cited.

ANDREW R. JUHASZ, *Primary Examiner.*

G. A. DOST, *Assistant Examiner.*